Feb. 7, 1933.   R. E. MAES   1,896,321
TEATCUP FOR MILKING MACHINES
Original Filed Jan. 10, 1930
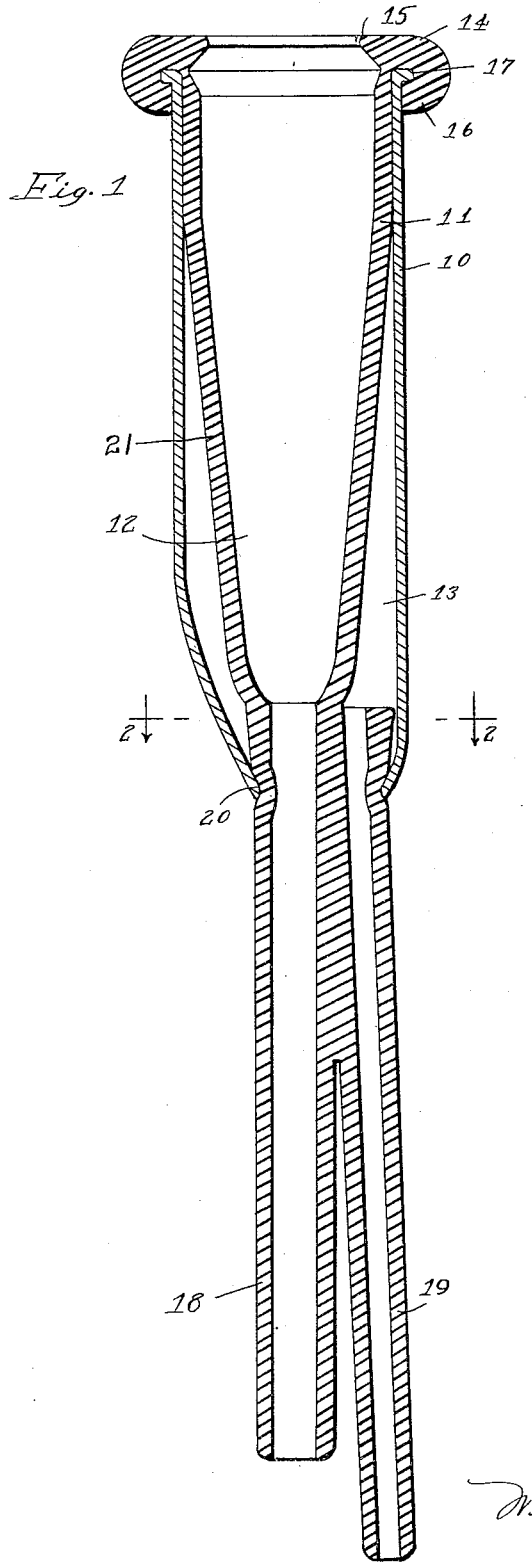
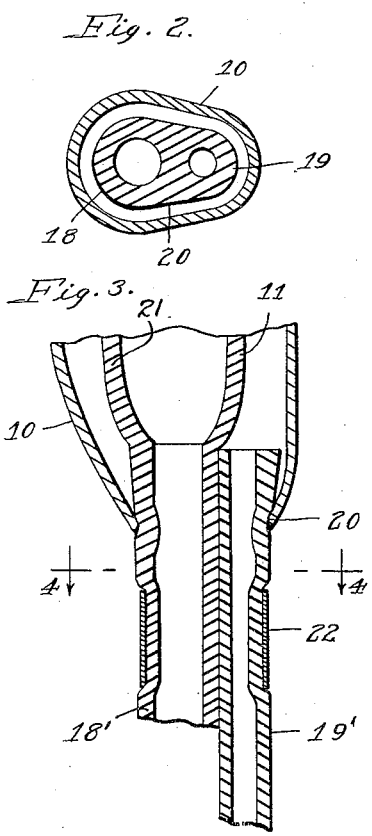

Patented Feb. 7, 1933

1,896,321

UNITED STATES PATENT OFFICE

ROBERT E. MAES, OF BELOIT, WISCONSIN

TEATCUP FOR MILKING MACHINE

Application filed January 10, 1930, Serial No. 419,837. Renewed June 11, 1932.

This invention relates to improvements in teatcups for milking machines.

Teatcups now in use have a rubber lining, or so-called inflation, inside a tubular shell with an annular external lip or other detail at the upper end thereof for making an airtight joint with the upper end of the shell. The shell is often flared outwardly to fit air tight in said lip. At the lower end of the inflation is an extension known as the milk tube. This passes through a hole in the lower end of the shell with an air-tight fit. It is common to make the milk tube integral with the inflation. The milk tube communicates steady suction to the space inside of the inflation, commonly known as the central or permanent vacuum chamber. Another tube, referred to as the pulsation tube, is provided to alternately evacuate and admit air to the annular space inside of the shell and outside of the inflation, that space being referred to as the alternating vacuum chamber.

The shell is now made with a nipple projecting from one side thereof for attachment of the pulsation tube. Such construction has various objections that will be enumerated hereinafter, and involves an excessive cost of production. It is, therefore, the principal object of my invention to overcome these objections by combining the pulsation tube with the milk tube so that both are arranged to be drawn through one and the same hole in the lower end of the shell. The pulsation tube is thus placed in communication with the alternating vacuum chamber by the mere insertion of the inflation, and there is no need for providing the nipple commonly used and the extra operation of connecting the pulsation tube to the nipple is eliminated. A much neater and more serviceable device is thereby produced, which can, furthermore, be made at a lower cost.

The invention is illustrated in the accompanying drawing, wherein—

Figure 1 is a longitudinal section through a teatcup embodying my invention;

Fig. 2 is a cross-section on the line 2—2 of Fig. 1;

Fig. 3 is a view similar to Fig. 1 showing a slightly modified construction, and Fig. 4 is a cross-section on the line 4—4 of Fig. 3.

The same reference numerals are applied to corresponding parts throughout the views.

Referring first to Figs. 1 and 2, the teatcup illustrated is of more or less conventional construction comprising a shell 10 with an inflation 11 made of gum rubber or the like disposed therein and providing the central or permanent vacuum chamber 12 inside the same and the outer alternating vacuum chamber 13 about the same in said shell. The upper end of the inflation 11 has a neck 14 molded integral therewith and providing the usual inner annular lip 15 and a heavy external annular lip 16 fitting over and making an airtight joint with the flared upper end 17 of the shell in the usual way. The details thus far described form no part of the present invention, excepting only in so far as they cooperate with the novel features now to be described.

According to my invention, instead of merely molding the milk tube 18 integral with the reduced lower end of the inflation 11, as heretofore, I mold the milk tube 18 and pulsation tube 19 together, both integral with the reduced lower end of the inflation 11. An oblong hole 20 is provided in the lower end of the shell 10 through which the two tubes are passed with a snug fit at their junction portion enough to make an air-tight joint. This construction, as compared with what is now in use, where the pulsation tube is separate from the milk tube presents various advantages. For one thing, the pulsation tube 19, after extension of the tubes 18 and 19 through the hole 20, can be connected directly with the pulsator; there is no separate tube to handle, which had to be fastened onto a nipple on the shell at its one end and fastened at its other end to the pulsator. That is to say, the elimination of the extra part means the elimination of an operation and saves the dairyman's time. Furthermore, the fact that the pulsation tube does not have to be attached to a nipple and removed again every time the device is being cleaned eliminates the objection that the tube after repeated attachment and removal had such a loose fit that it was apt to be knocked off by the animal in moving about or kicking the tube. In addition to these practical advantages, however, there is to be considered the fact that it involves no additional cost. To mold the pulsation tube in combination with the inflation and milk tube, as a matter of fact, involves much less cost than the provision of the nipple on the shell with the separate pulsation tube. The shell, because of its freedom from projections, can be die-cast, which means a considerable saving in cost. As a matter of fact, the present structure costs less than one-third of the cost of the structure made the old way; the old construction involved the use of a spun brass shell onto which the nipple had to be soldered, which meant a lot of costly labor, and introduced an objection because of the likelihood for the soldered nipple to break off, soldered joints being notoriously impractical where any strain is apt to be imposed. Certain machine operations were also necessitated in the old construction to provide a hole or holes through the shell wall for communication with the nipple, which meant more cost. It will be observed in passing that I have tapered the junction portion, as at 21, so that as the tubes are drawn through the lower end of the shell they are caused to wedge in the hole, and the fit can be made as tight as desired by simply pulling the tubes out farther. In this connection, attention is also called to the fact that the pulsation tube 19 is made long enough so that it reaches appreciably above the hole 20. This is to allow for stretching of the inflation 11, such as is bound to occur in service, and enables the tubes 18 and 19 to be pulled out farther and farther while still affording a good air-tight joint at 20. This insures long life and continued satisfactory service of the unit.

The operation of the teatcup embodying my invention is the same as the others now in use, and is thought to be apparent from the foregoing description. It will be pointed out, however, that the change in structure of the teatcup provided in accordance with my invention does not change the method of assembling the inflation in the shell; the milk tube, which was formerly passed through the lower end of the shell and pulled out until a tight joint was secured with the shell adjacent the lower end of the inflation, is, in accordance with my invention, arranged to have the pulsation tube extended with it through the lower end of the shell, and then the two tubes are pulled out together until an air-tight joint is made with the shell adjacent the lower end of the inflation. Teatcups of this general type have become so firmly established as the most practical form; hence, the importance of providing a structure with the pulsation tube combined with the milk tube that is applicable to this type of teatcup. So far as I am aware, this has not been done before. In passing, attention is further called to the fact that making the pulsation tube 19 long enough so that it reaches appreciably above the hole 20 at the lower end of the shell 10 affords another advantage aside from that of enabling the tubes to be pulled out farther and farther while still affording a good air-tight joint with the shell, and that is, that any water that may accidentally find its way into the chamber 13 in the shell during the washing of the cup, will be trapped in the shell below the level of the upper end of the pulsation tube and will not, therefore, be drawn into the pulsator, where it would otherwise cause no end of trouble by the rusting of the metal parts that are made with a fine fit for the delicate kind of operation expected of them.

It is evident that many of the advantages of my invention might be gained by making the pulsation tube separate but joining it in some other manner to the milk tube so that it can still be brought through the same hole with the milk tube, as herein contemplated, without necessitating the molding of it integral therewith. Thus, in Fig. 3, the pulsation tube 19' is separate from the milk tube 18', but the two are firmly clamped together as by means of a metal band 22 of small enough dimensions to pass through the hole 20 in the lower end of the shell 10. The side of the tube 18' may be molded with a longitudinal trough 23 for reception of the tube 19' and the tubes may be cemented or vulcanized together if necessary to insure an air-tight joint. In this case too, the taper 21 may be provided on the junction portion of the two tubes for the purpose described. This construction affords an advantage from the standpoint that when the pulsation tube gets too short for further use, because of its having to be cut off at the outer end when the same gets spread too much for further satisfactory use, owing to its having to be removed twice a day from its connection with the pulsator for cleaning, the pulsation tube can be replaced and the inflation and milk tube need not be thrown away. In other words, there is practically no waste when the construction is built up in this way instead of being molded in one piece.

It is believed the foregoing description conveys a clear understanding of my invention and all of its advantages. The appended claims have been drawn with a view to covering all legitimate modifications and adaptations.

I claim:

1. A teatcup comprising a plain tubular shell having a larger open mouth at one end and a smaller opening at its other end, a collapsible resilient inflation disposed in said shell and arranged to make an air-tight joint at its upper end in the mouth of said shell, a milk tube extending from the lower end of said inflation and arranged to be extended through the open lower end of said shell whereby to permit pulling the inflation into said shell through the upper end thereof, and a pulsation tube combined with the milk tube and reaching from a point adjacent the lower end of the inflation, the same being thereby arranged to be extended through the open lower end of said shell with the milk tube, the two tubes being arranged to be pulled outwardly together and to draw up adjacent the lower end of the inflation to an air-tight joint in the lower end of the shell.

2. A teatcup as set forth in claim 1, wherein the inflation is so proportioned in length with relation to the shell that it reaches normally only part way to the lower end of the shell, and wherein the pulsation tube is made long enough to reach normally some distance above the open lower end of said shell when the milk tube and pulsation tube are pulled out the normal distance for an air-tight joint with the shell, whereby to permit pulling out the two tubes farther and farther to compensate for the normal amount of stretching of the inflation in service, the tubes making an air-tight joint with the shell in all normal positions of the tubes with respect to the shell.

3. A teatcup as set forth in claim 1, wherein the inflation is so proportioned in length with relation to the shell that it reaches normally only part way to the lower end of the shell, and wherein the pulsation tube is made long enough to reach normally some distance above the open lower end of said shell when the milk tube and pulsation tube are pulled out the normal distance for an air-tight joint with the shell, whereby to permit pulling out the two tubes farther and farther to compensate for the normal amount of stretching of the inflation in service, the tubes making an air-tight joint with the shell in all normal positions of the tubes with respect to the shell, and wherein the two tubes are tapered where they are intended to make an air-tight joint in the lower end of the shell, so that they wedge tighter and tighter the farther they are pulled out.

4. A teatcup comprising a plain tubular shell having a larger open mouth at one end and a smaller opening at its other end, a collapsible resilient inflation disposed in said shell and arranged to make an air-tight joint at its upper end in the mouth of said shell, a milk tube extending from the lower end of said inflation and arranged to be extended through the open lower end of said shell whereby to permit pulling the inflation into said shell through the upper end thereof, and a pulsation tube combined with the milk tube and extended along with the latter through the open lower end of said shell, the two tubes being arranged to be pulled outwardly together and to draw up adjacent the lower end of the inflation to an air-tight joint in the lower end of the shell, the said pulsation tube when the two tubes are pulled out the normal amount having its upper end reaching to an appreciable elevation in the shell above the aforesaid joint and in spaced relation to the inside walls of the shell to leave a water collecting pocket in the shell below the open end of the tube substantially as and for the purpose described.

5. A teatcup comprising a plain tubular shell having a larger open mouth at one end and a smaller opening at its other end, a collapsible resilient inflation disposed in said shell and arranged to make an air-tight joint at its upper end in the mouth of said shell, a milk tube extending from the lower end of said inflation and arranged to be extended through the open lower end of said shell whereby to permit pulling the inflation into said shell through the upper end thereof, a pulsation tube alongside of and fixed to the milk tube and reaching from a point adjacent the lower end of the inflation, the same being thereby arranged to be extended through the open lower end of said shell with the milk tube, the two tubes being arranged to be pulled outwardly together and to draw up adjacent the lower end of the inflation to an air-tight joint in the lower end of the shell, and means for holding the two tubes together as one, whereby replacement of the pulsation tube is permitted without replacement of the inflation and milk tube.

6. A teatcup comprising a plain tubular shell having a larger open mouth at one end and a smaller opening at its other end, a collapsible resilient inflation disposed in said shell and arranged to make an air-tight joint at its upper end in the mouth of said shell, a milk tube extending from the lower end of said inflation and arranged to be extended through the open lower end of said shell whereby to permit pulling the inflation into said shell through the upper end thereof, a pulsation tube alongside of and fixed to the milk tube and reaching from a point adjacent the lower end of the inflation, the same being thereby arranged to be extended through the open lower end of said shell with the milk tube, the two tubes being arranged to be pulled outwardly together and to draw up adjacent the lower end of the inflation to an air-tight joint in the lower end of the shell, and means for holding the two tubes together as one, the said means reaching from the milk tube around the outside of the pulsation tube and disposed appreciably below the upper ends of the two tubes and being so constructed that it is arranged to pass readily through the open lower end of the shell so as to permit pulling of the tubes through said opening.

In witness of the foregoing I affix my signature.

ROBERT E. MAES.